(12) United States Patent
Chan et al.

(10) Patent No.: US 12,107,456 B2
(45) Date of Patent: Oct. 1, 2024

(54) BACKUP POWER SUPPLY SYSTEM AND CONTROL METHOD THEREOF

(71) Applicant: ADATA TECHNOLOGY CO., LTD., New Taipei (TW)

(72) Inventors: Shun-Wen Chan, Taipei (TW); Wei-Jen Kuo, Taipei (TW)

(73) Assignee: ADATA TECHNOLOGY CO., LTD., New Taipei (TW)

( * ) Notice: Subject to any disclaimer, the term of this patent is extended or adjusted under 35 U.S.C. 154(b) by 15 days.

(21) Appl. No.: 17/868,868

(22) Filed: Jul. 20, 2022

(65) Prior Publication Data
US 2023/0163627 A1 May 25, 2023

(30) Foreign Application Priority Data

Nov. 22, 2021 (TW) .................................. 110143316

(51) Int. Cl.
*H02J 3/32* (2006.01)
*H02J 9/06* (2006.01)

(52) U.S. Cl.
CPC .............. *H02J 9/062* (2013.01); *H02J 3/32* (2013.01)

(58) Field of Classification Search
CPC ...... H02J 9/062; H02J 3/32; H02J 9/06; H02J 9/061
USPC ......................................................... 307/66
See application file for complete search history.

(56) References Cited

U.S. PATENT DOCUMENTS

| | | | |
|---|---|---|---|
| 9,729,007 B2 | 8/2017 | Cheng et al. | |
| 2008/0217998 A1* | 9/2008 | Parmley | H02J 7/35 307/65 |
| 2009/0167083 A1* | 7/2009 | Kuo | H02J 1/08 307/31 |
| 2010/0164290 A1* | 7/2010 | Chiang | H02J 9/061 307/66 |
| 2013/0076143 A1 | 3/2013 | Guo | |
| 2017/0346292 A1* | 11/2017 | Handelsman | H02J 3/38 |

FOREIGN PATENT DOCUMENTS

| | | |
|---|---|---|
| CN | 112271775 A | 1/2021 |
| TW | 201025791 A | 7/2010 |
| TW | I454016 B | 9/2014 |
| TW | M565440 U | 8/2018 |
| TW | 201916531 A | 4/2019 |

* cited by examiner

*Primary Examiner* — Rexford N Barnie
*Assistant Examiner* — Xuan Ly
(74) *Attorney, Agent, or Firm* — Li & Cai Intellectual Property (USA) Office

(57) ABSTRACT

A backup power supply system and a control method thereof are provided. The backup power supply system includes a power supply circuit and an uninterruptible power supply. The power supply circuit is configured to receive utility power, and the uninterruptible power supply is connected to the power supply circuit and stores backup power. When the utility power is normal, the power supply circuit supplies power to the uninterruptible power supply, and the uninterruptible power supply outputs a first alternating current voltage that meets a utility power specification to the alternating current load. When the utility power is abnormal, the uninterruptible power supply outputs a second alternating current voltage that meets the utility power specification to the alternating current load.

9 Claims, 6 Drawing Sheets

BACKUP POWER SUPPLY SYSTEM AND CONTROL METHOD THEREOF

CROSS-REFERENCE TO RELATED PATENT APPLICATION

This application claims the benefit of priority to Taiwan Patent Application No. 110143316, filed on Nov. 22, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a backup power supply system and a control method thereof, and more particularly to a backup power supply system that can directly supply power to an alternating current load whether or not utility power is normal and a control method thereof.

BACKGROUND OF THE DISCLOSURE

An uninterruptible power supply (UPS) is an apparatus that has been widely used for managing problems associated with sudden abnormalities in utility power (e.g., a temporary power failure or a power interference). The uninterruptible power supply provides reliable backup power for a computer, a server, or a medical device, so that operation of these electronic devices will not be interrupted due to abnormal utility power conditions.

However, the conventional uninterruptible power supply can only provide a direct current (DC) voltage to a DC load. For certain alternating current (AC) loads (e.g., a display screen), the AC load cannot continue to operate normally in situations where the utility power is abnormal.

SUMMARY OF THE DISCLOSURE

In response to the above-referenced technical inadequacies, the present disclosure provides a backup power supply system and a control method thereof.

In one aspect, the present disclosure provides a backup power supply system. The backup power supply system includes power supply circuit and an uninterruptible power supply. The power supply circuit is configured to receive utility power, and the uninterruptible power supply is connected to the power supply circuit and stores backup power. The uninterruptible power supply includes an alternating current output terminal, and the alternating current output terminal is configured to connect to an alternating current load. When the utility power is normal, the power supply circuit supplies the power to the uninterruptible power supply, the alternating current output terminal of the uninterruptible power supply outputs a first alternating current voltage to the alternating current load. The first alternating current voltage meets a utility power specification. When the utility power is abnormal, the uninterruptible power supply supplies the power to the power supply circuit, the alternating current output terminal of the uninterruptible power supply outputs a second alternating current voltage to the alternating current load. The second alternating current voltage meets the utility power specification.

In another aspect, the present disclosure provides a control method of a backup power supply system. The backup power supply system comprises a power supply circuit and an uninterrupted power circuit, and the uninterrupted power circuit stores backup power. The control method comprises: determining, by the power supply circuit, whether utility power is normal; providing, by the power supply circuit, power to the uninterrupted power circuit when the utility power is normal; outputting, by the uninterrupted power circuit, a first alternating current voltage to an alternating current load when the utility power is normal, in which the first alternating current voltage meets a utility power specification; and outputting, by the uninterrupted power circuit, a second alternating current voltage to the alternating current load when the utility power is abnormal, in which the second alternating current voltage meets the utility power specification.

Therefore, in the backup power supply system and the control method thereof provided by the present disclosure, the backup power supply system can directly supply alternating current that meets the utility power specification to the alternating current (AC) load regardless of whether or not the utility power is normal. In this way, the AC load can continue to operate normally.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
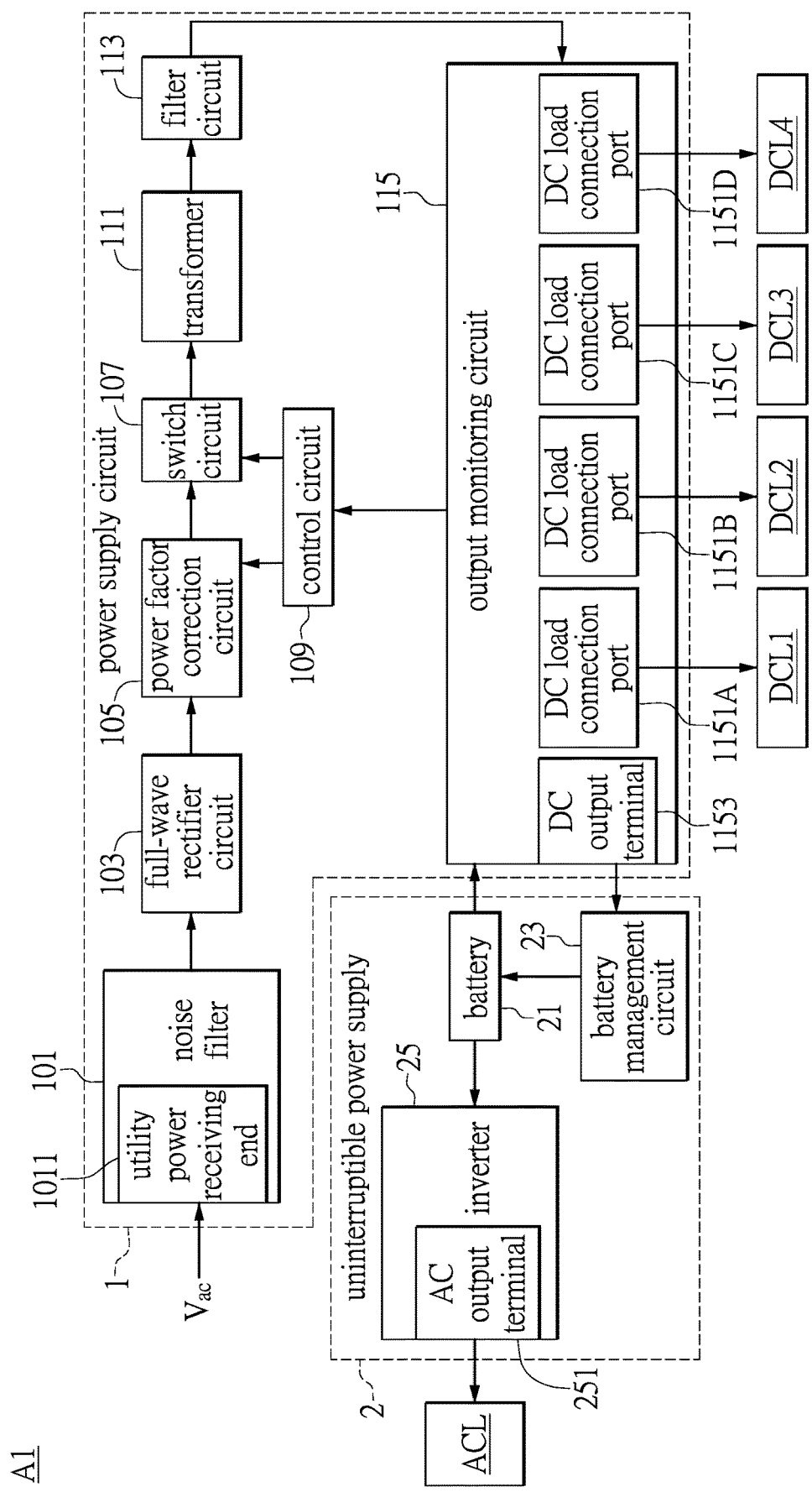
FIG. 1 is a functional block diagram of a backup power supply system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a functional block diagram of a backup power supply system according to a first embodiment of the present disclosure. Referring to FIG. 1, a backup power supply system A1 comprises a power supply circuit 1 and an uninterruptible power supply 2. The power supply circuit 1 includes a noise filter 101, a full-wave rectifier circuit 103, a power factor correction circuit 105, a switch circuit 107, a control circuit 109, a transformer 111, a filter circuit 113 and an output monitoring circuit 115. The uninterruptible power supply 2 is connected to the output monitoring circuit 115.

The purpose of the noise filter 101 is to reduce an electromagnetic interference (EMI). The noise filter 101 is provided with a utility power receiving terminal 1011, and the utility power receiving terminal 1011 is configured to receive a utility power (Vac).

The full-wave rectifier circuit 103 is connected to an output terminal of the noise filter 101, and the full-wave rectifier circuit 103 performs a full-wave rectification on the utility power (Vac), so as to convert negative voltages of the utility power (Vac) into positive voltages.

The power factor correction circuit 105 can be, for example, an active power factor correction circuit or a passive power factor correction circuit, and is connected to an output terminal of the full-wave rectifier circuit 103. The function of the power factor correction circuit 105 is to increase a power factor of an alternating current (AC) voltage signal.

The switch circuit 107 can be, for example, a transistor switch circuit connected to an output terminal of the power factor correction circuit 105. The function of the switch circuit 107 is to adjust a waveform of the AC voltage signal. The control circuit 109 is connected to the output monitoring circuit 115, the power factor correction circuit 105, and the switch circuit 107.

The transformer 111 is connected to an output terminal of the switch circuit 107, and an output voltage of the transformer 111 is lower than an input voltage of the transformer 111. The filter circuit 113 is connected to the transformer 111 for eliminating ripples of the AC voltage signal.

The output monitoring circuit 115 is connected to an output terminal of the filter circuit 113 and an input terminal of the control circuit 109. When the utility power is abnormal, the output monitoring circuit 115 cannot receive a voltage signal from the filter circuit 113. At this time, the output monitoring circuit 115 outputs a first control instruction to the control circuit 109. The control circuit 109 adjusts the power factor correction circuit 105 and the switch circuit 107 according to the first control instruction. Conversely, when the utility power is normal, the output monitoring circuit 115 receives the voltage signal from the filter circuit 113. At this time, the output monitoring circuit 115 outputs a second control instruction to the control circuit 109. The control circuit 109 adjusts the power factor correction circuit 105 and the switch circuit 107 according to the second control instruction.

The output monitoring circuit 115 includes a plurality of direct current (DC) load connection ports 1151A to 1151D, and the DC load connection ports 1151A to 1151D are configured to connect a plurality of different DC loads (DCL1 to DCL4). For example, the DC load connection ports 1151A to 1151D can output DC voltages with 12 volt, 5 volt, 5 volt, and 3.3 volt, respectively.

The uninterruptible power supply 2 includes a battery 21, a battery management circuit 23, and an inverter 25. The battery 21 is connected to the output monitoring circuit 115, the battery management circuit 23, and the inverter 25. The inverter 25 is provided with an alternating current (AC) output terminal 251. The AC output terminal 251 of the inverter 25 is configured to connect an alternating current load (ACL).

When the utility power (Vac) is normal, the output monitoring circuit 115 provides the multiple DC voltages to the DC loads (DCL1 to DCL4) through the DC load connection ports 1151A to 1151D based on the utility power (Vac). A DC output terminal 1153 of the output monitoring circuit 115 outputs the DC voltage to the battery management circuit 23 of the uninterruptible power supply 2. After the battery management circuit 23 receives the power from the output monitoring circuit 115, the battery management circuit 23 supplies the power to the battery 21, so that the battery 21 can store backup power. The battery 21 outputs the DC voltage to the inverter 25, and the AC output terminal 251 of the inverter 25 outputs a first AC voltage that meets a utility power specification to the AC load (ACL).

When the utility power (Vac) is abnormal, one part of the backup power stored in the battery 21 is supplied to the output monitoring circuit 115 of the power supply circuit 1, and another part of the backup power stored in the battery 21 is supplied to the inverter 25 of the uninterruptible power supply 2. The output monitoring circuit 115 is provided with a plurality of different DC-DC converters. After the output monitoring circuit 115 receives the power from the battery 21, the output monitoring circuit 115 converts the power from the battery 21 into the DC voltages with different volts and outputs these DC voltages with different volts to the DC loads DCL1 to DCL4 respectively through the DC load connection ports 1151A to 1151D. After the inverter 25 receives the power from the battery 21, the AC output terminal 251 of the inverter 25 outputs a second AC voltage that meets the utility power specification to the AC load (ACL).

Figure 2:
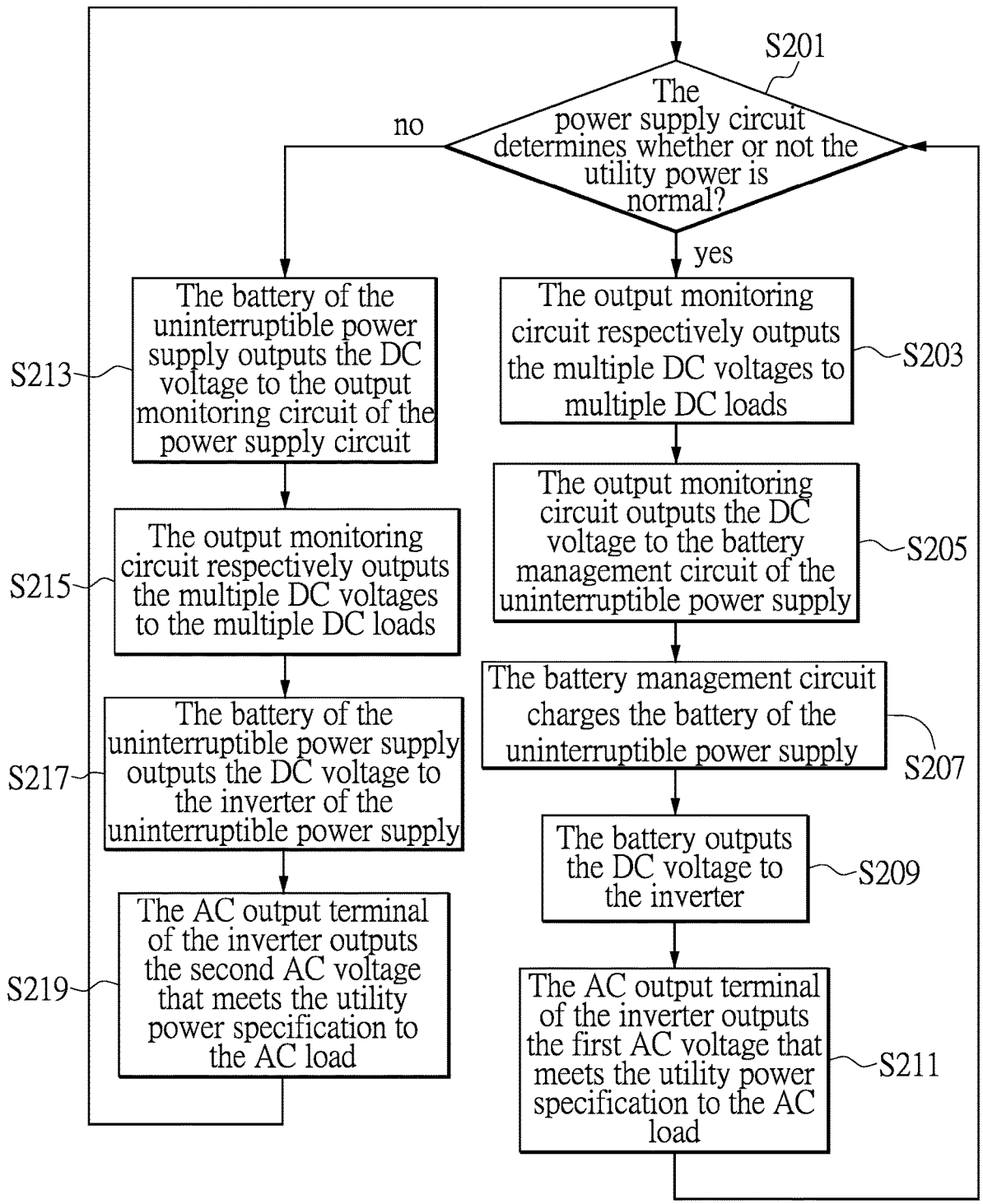
FIG. 2 is flowchart of a control method of the backup power supply system in FIG. 1.

FIG. 2 is flowchart of a control method of the backup power supply system in FIG. 1. Referring to FIG. 2, in a step S201, the power supply circuit 1 determines whether or not the utility power is normal. When the utility power is normal, the step S201 is followed by a step S203. In the step S203, the output monitoring circuit 115 respectively outputs the multiple DC voltages to the multiple DC loads (DCL1 to DCL4). The step S203 is followed by a step S205. In the step S205, the output monitoring circuit 115 outputs the DC voltage to the battery management circuit 23 of the uninterruptible power supply 2. The step S205 is followed by a step S207. In the step S207, the battery management circuit 23 charges the battery 21 of the uninterruptible power supply 2. The step S207 is followed by a step S209. In the step S209, the battery 21 outputs the DC voltage to the inverter 25. The step S209 is followed by a step S211. In the step S211, the AC output terminal 251 of the inverter 25 outputs the first AC voltage that meets the utility power specification to the AC load (ACL). After the step S211, the control method returns to the step S201.

When the power supply circuit 1 determines that the utility power (Vac) is abnormal, the step S201 is followed by a step S213. In the step S213, the battery 21 of the uninterruptible power supply 2 outputs the DC voltage to the output monitoring circuit 15 of the power supply circuit 1. The step S213 is followed by a step S215. In the step S215, the output monitoring circuit 15 respectively outputs the multiple DC voltages to the multiple DC loads (DCL1 to DCL4). The step S215 is followed by a step S217. In the step S217, the battery 21 of the uninterruptible power supply 2 outputs the DC voltage to the inverter 25 of the uninterruptible power supply 2. The step S217 is followed by a step S219. In the step S219, the AC output terminal 251 of the inverter 25 outputs the second AC voltage that meets the utility power specification to the AC load (ACL). After the step S219, the control method returns to the step S201.

For example, when the AC utility power is normal, the power supply circuit 1 provides the multiple DC voltage signals with different volts to a host of a personal computer system, and the uninterruptible power supply 2 provides the first AC voltage that meets the utility power specification to a display screen. When the AC utility power is abnormal, the battery 21 of the uninterrupted power circuit 2 respectively supplies the power to the power supply circuit 1 and the inverter 25 of the uninterrupted power circuit 2. After the power supply circuit 1 receives the power from the battery 21, the multiple DC-DC converters of the power supply circuit 1 convert the power from the battery 21 into the multiple DC voltage signals with different volts, and respectively provide the DC voltage signals with different volts to the host of the personal computer system. After the inverter 25 receives the power from the battery 21, the inverter 25 outputs the second AC voltage that meets the utility power specification to the display screen.

Figure 3:
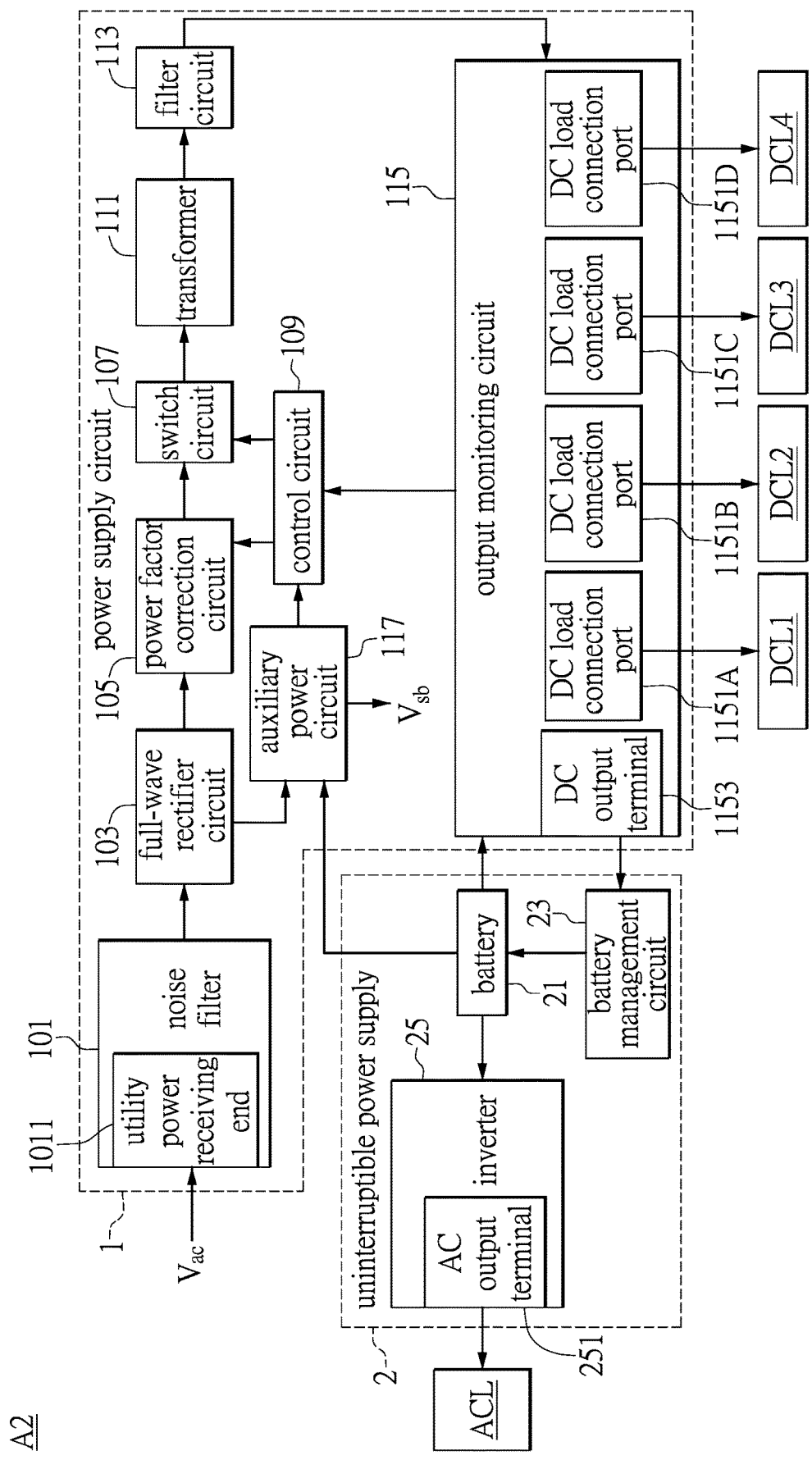
FIG. 3 is a functional block diagram of a backup power supply system according to a second embodiment of the present disclosure.

FIG. 3 is a functional block diagram of a backup power supply system according to a second embodiment of the present disclosure. The difference between a backup power supply system A2 in FIG. 3 and the backup power supply system A1 in FIG. 1 is that the backup power supply system A2 further comprises an auxiliary power circuit 117. The auxiliary power circuit 117 is connected to the output terminal of the full-wave rectifier circuit 103 and the input terminal of the control circuit 109. When the utility power (Vac) is normal, the full-wave rectifier circuit 103 supplies the power to the auxiliary power circuit 117. When the utility power (Vac) is abnormal, the battery 21 of the uninterruptible power supply 2 supplies the power to the auxiliary power circuit 117, and the function of the auxiliary power circuit 117 is to supply the power to the control circuit 109 and to output a standby voltage. A value of the standby voltage can be, for example, 5 volt.

Figure 4:
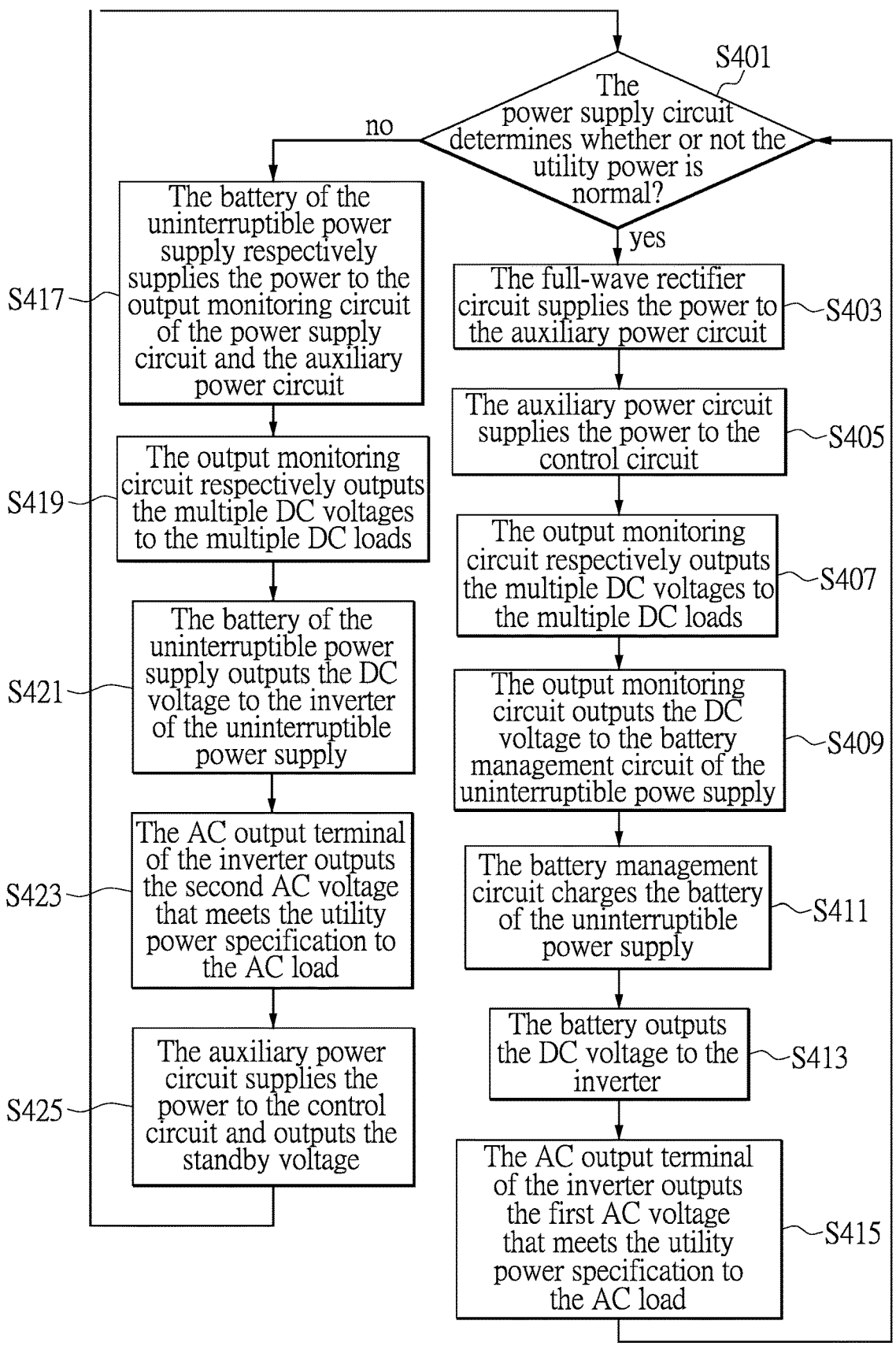
FIG. 4 is flowchart of a control method of the backup power supply system in FIG. 3.

FIG. 4 is flowchart of a control method of the backup power supply system in FIG. 3. Referring to FIG. 4, in a step S401, the power supply circuit 1 determines whether or not the utility power (Vac) is normal. When the utility power is normal, the step S401 is followed by a step S403. In the step S403, the full-wave rectifier circuit 103 supplies the power to the auxiliary power circuit 117. The step S403 is followed by a step S405. In the step S405, the auxiliary power circuit 117 supplies the power to the control circuit 109. The step S405 is followed by a step S407. In the step S407, the output monitoring circuit 115 respectively outputs the multiple DC voltages to the multiple DC loads (DCL1 to DCL4). The step S407 is followed by a step S409. In the step S409, the output monitoring circuit 115 outputs the DC voltage to the battery management circuit 23 of the uninterruptible power supply 2. The step S409 is followed by a step S411. In the step S411, the battery management circuit 23 charges the battery 21 of the uninterruptible power supply 2. The step S411 is followed by a step S413. In the step S413, the battery 21 outputs the DC voltage to the inverter 25. The step S413 is followed by a step S415. In the step S415, the AC output terminal 251 of the inverter 25 outputs the first AC voltage that meets the utility power specification to the AC load (ACL). After the step S415, the control method returns to the step S401.

When the power supply circuit 1 determines that the utility power (Vac) is abnormal, the step S401 is followed by a step S417. In the step S417, the battery 21 of the uninterruptible power supply 2 respectively supplies the power to the output monitoring circuit 15 of the power supply circuit 1 and the auxiliary power circuit 117. The step S417 is followed by a step S419. In the step S419, the output monitoring circuit 115 respectively outputs the multiple DC voltages to the multiple DC loads (DCL1 to DCL4). The step S419 is followed by a step S421. In the step S421, the battery 21 of the uninterruptible power supply 2 outputs the DC voltage to the inverter 25 of the uninterruptible power supply 2. The step S421 is followed by a step S423. In the step S423, the AC output terminal 251 of the inverter 25 outputs the second AC voltage that meets the utility power specification to the AC load (ACL). The step S423 is followed by a step S425. In the step S425, the auxiliary power circuit 117 supplies the power to the control circuit 109 and outputs the standby voltage. After the step S425, the control method returns to the step S401.

Figure 5:
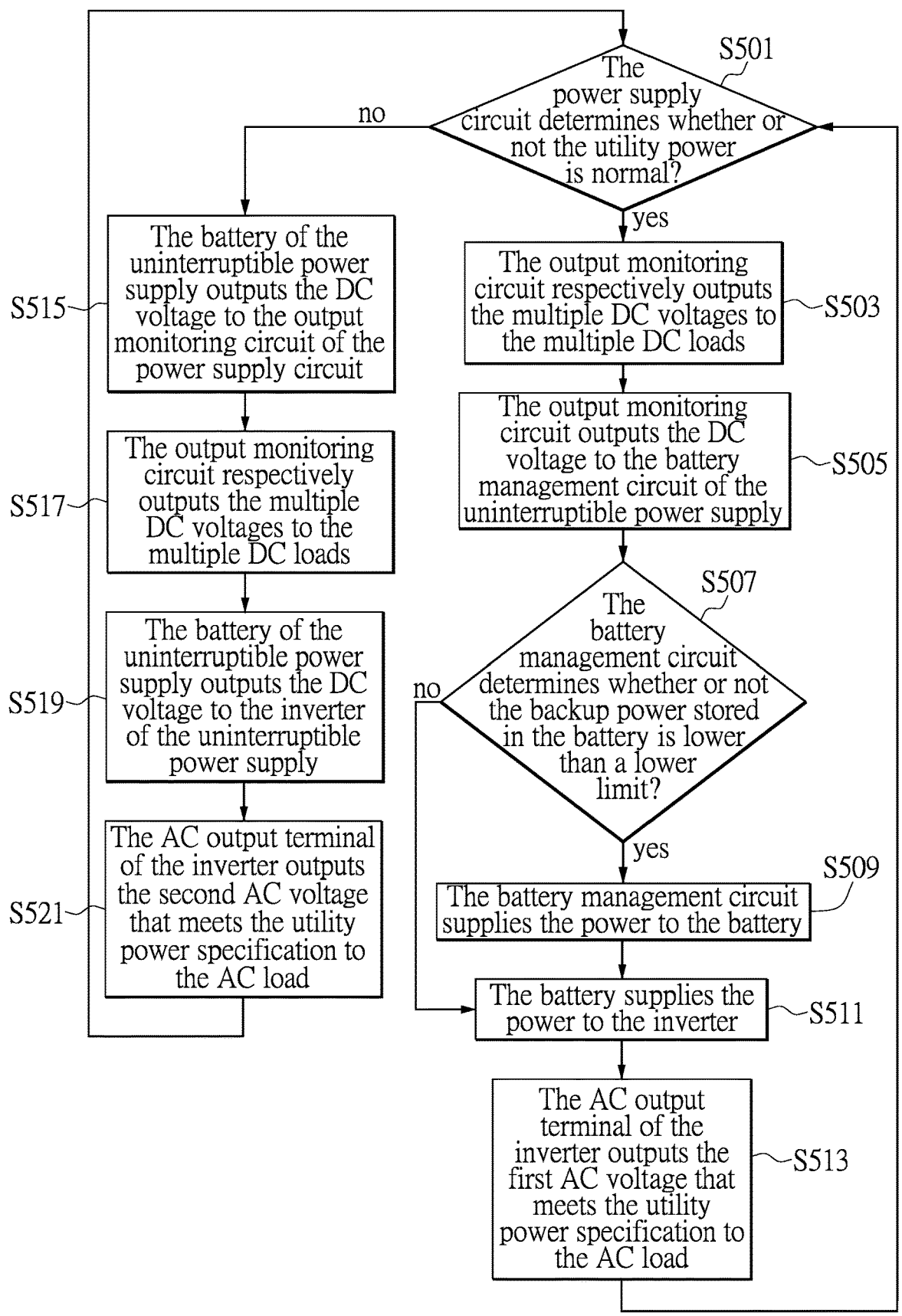
FIG. 5 is a flowchart of a control method of a backup power supply system according to a third embodiment of the present disclosure.

FIG. 5 is a flowchart of a control method of a backup power supply system according to a third embodiment of the present disclosure. Referring to FIG. 5, in a step S501, the power supply circuit 1 determines whether or not the utility power (Vac) is normal. When the utility power (Vac) is normal, the step S501 is followed by a step S503. In the step S503, the output monitoring circuit 115 respectively outputs the multiple DC voltages to the multiple DC loads (DCL1 to DCL4). The step S503 is followed by a step S505. In the step S505, the output monitoring circuit 115 outputs the DC voltage to the battery management circuit 23 of the uninterruptible power supply 2. The step S505 is followed by a step S507. In the step S507, the battery management circuit 23 determines whether or not the backup power stored in the battery 21 is lower than a lower limit. When the backup power stored in the battery 21 is lower than the lower limit, the step S507 is followed by a step S509. In the step S509, the battery management circuit 23 supplies the power to the battery 21. The step S509 is followed by a step S511. In the step S511, the battery 21 supplies the power to the inverter 25. The step S511 is followed by a step S513. In the step S513, the AC output terminal 251 of the inverter 25 outputs the first AC voltage that meets the utility power specification to the AC load (ACL). After the step S513, the control method returns to the step S501.

When the backup power stored in the battery 21 is not lower than the lower limit, the step S511 is executed.

When the power supply circuit 1 determines that the utility power (Vac) is abnormal, then a step S515 is executed. In the step S515, the battery 21 of the uninterruptible power supply 2 outputs the DC voltage to the output monitoring circuit 115 of the power supply circuit 1. The step S515 is followed by a step S517. In the step S517, the output monitoring circuit 115 respectively outputs the multiple DC voltages to the multiple DC loads (DCL1 to DCL4). The step S517 is followed by a step S519. In the step S519, the battery 21 of the uninterruptible power supply 2 outputs the DC voltage to the inverter 25 of the uninterruptible power supply 2. The step S519 is followed by a step S521. In the step S521, the AC output terminal 251 of the inverter 25 outputs the second AC voltage that meets the utility power specification to the AC load (ACL). After the step S521, the control method returns to the step S501.

Figure 6:
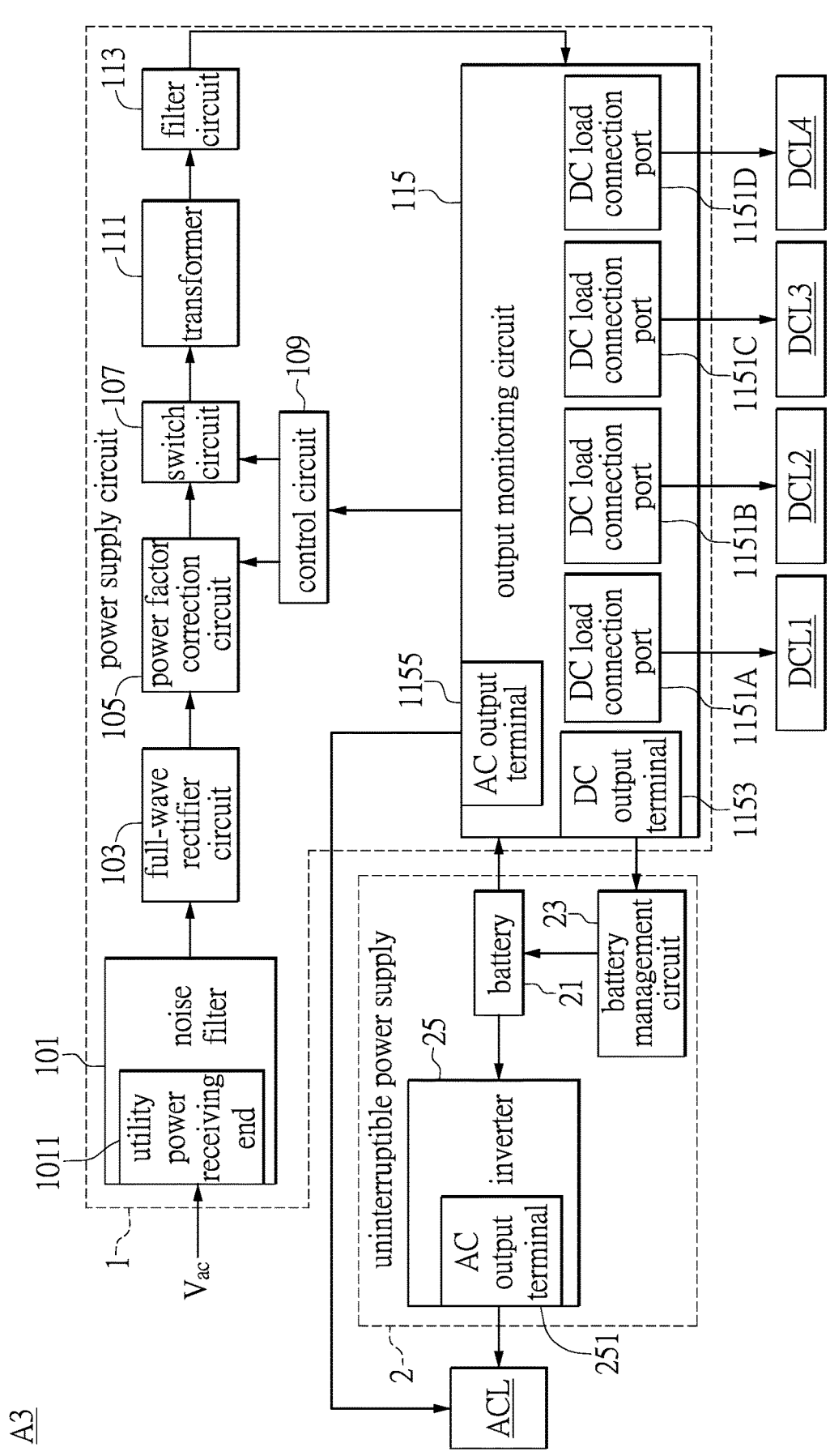
FIG. 6 is a functional block diagram of a backup power supply system according to a fourth embodiment of the present disclosure.

FIG. 6 is a functional block diagram of a backup power supply system according to a fourth embodiment of the present disclosure. The difference between a backup power supply system A3 in FIG. 6 and the backup power supply system A1 in FIG. 1 is that the output monitoring circuit 115 further includes an AC output terminal 1155. The AC output terminal 1155 is configured to connect to the AC load (ACL).

When the power supply circuit 1 determines that the utility power (Vac) is normal, the output monitoring circuit 115 of the power supply circuit 1 provides the multiple DC voltages to the DC loads (DCL1 to DCL4) respectively through the DC load connection ports 1151A-1151D. The DC output terminal 1153 of the output monitoring circuit 115 outputs the DC voltage to the battery management circuit 23 of the uninterruptible power supply 2. The AC output terminal 1155 of the output monitoring circuit 115 outputs the first AC voltage that meets the utility power specification to the AC load (ACL). After the battery management circuit 23 receives the power from the output monitoring circuit 115, the battery management circuit 23 charges the battery 21.

When the power supply circuit 1 determines that the utility power (Vac) is abnormal, the battery 21 respectively supplies the power to the output monitoring circuit 115 of the power supply circuit 1 and the inverter 25 of the uninterruptible power supply 2. Then, the output monitoring circuit 115 outputs the multiple DC voltages to the DC loads (DCL1 to DCL4) respectively through the DC load connection ports 1151A to 1151D. Through the AC output terminal 251, the inverter 25 outputs the second AC voltage that meets the utility power specification to the AC load (ACL).

Beneficial Effects of the Embodiments

In conclusion, in the backup power supply system and the control method thereof provided by the present disclosure, when a load of a power station is too large or when machinery of the power station breaks down and causes an abnormality of the utility power, the power supply circuit can provide DC voltages with different volts to various DC loads, and the uninterruptible power supply can provide the AC voltage that meets the utility power specification to the AC load, so that the AC load and each of the DC loads can continue to operate normally.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A backup power supply system, comprising:
    a power supply circuit configured to receive utility power; and
    an uninterruptible power supply connected to the power supply circuit and storing backup power, wherein the uninterruptible power supply includes an alternating current output terminal, and the alternating current output terminal is configured to be connected to an alternating current load;
    wherein, when the utility power is normal, the power supply circuit supplies power to the uninterruptible power supply according to the utility power, and the alternating current output terminal of the uninterruptible power supply outputs a first alternating current voltage to the alternating current load; wherein the first alternating current voltage meets a utility power specification;
    wherein, when the utility power is abnormal, the uninterruptible power supply supplies a first part of the backup power to the power supply circuit, and the alternating current output terminal of the uninterruptible power supply outputs a second alternating current voltage to the alternating current load according to a second part of the backup power; wherein the second alternating current voltage meets the utility power specification;
    wherein, when the utility power is abnormal, the power supply circuit converts the first part of the backup power into a plurality of direct current voltages with different volts and outputs the plurality of direct current voltages with the different volts to a plurality of direct current loads;
    wherein the power supply circuit includes an output monitoring circuit, and the uninterruptible power supply includes a battery, a battery management circuit, and an inverter;
    wherein the battery stores the backup power, and the battery is connected to the battery management circuit, the inverter, and the output monitoring circuit;
    wherein the battery management circuit is further connected to the output monitoring circuit, and the inverter is provided with the alternating current output terminal;
    wherein the output monitoring circuit includes a plurality of direct current load connection ports, and the direct current load connection ports are configured to connect the plurality of direct current loads;
    wherein, when the utility power is abnormal, the battery outputs the first part of the backup power to the output monitoring circuit, the output monitoring circuit converts the first part of the backup power into the plurality of direct current voltages with the different volts, and the direct current load connection ports respectively output the plurality of direct current voltages with the different volts to the direct current loads;
    wherein the battery outputs the second part of the backup power to the inverter.

2. The backup power supply system according to claim 1, wherein, when the utility power is normal, the battery management circuit determines whether or not the backup power stored in the battery is sufficient; wherein, when the backup power is insufficient, the battery management circuit supplies the power to the battery; wherein, when the backup power stored in the battery is sufficient, the battery management circuit does not supply the power to the battery.

3. The backup power supply system according to claim 2, wherein, when the backup power stored in the battery is lower than a lower limit, the backup power is insufficient; wherein, when the backup power is not lower than the lower limit, the backup power is sufficient.

4. The backup power supply system according to claim 1, wherein the power supply circuit includes a noise filter, a full-wave rectifier circuit, a power factor correction circuit, a switch circuit, a control circuit, a transformer, and a filter circuit; wherein the full-wave rectifier circuit is connected to the noise filter and the power factor correction circuit, the noise filter is configured to receive the utility power, the switch circuit is connected to the power factor correction circuit, the control circuit is connected to the power factor correction circuit, the switch circuit and the output monitoring circuit, the transformer is connected to the switch circuit, and the filter circuit is connected to the transformer and the output monitoring circuit.

5. The backup power supply system according to claim 4, wherein, when the utility power is abnormal, the control circuit receives a first control instruction from the output monitoring circuit and correspondingly adjusts the power factor correction circuit and the switch circuit according to the first control instruction; wherein, when the utility power is normal, the control circuit receives a second control instruction from the output monitoring circuit and correspondingly adjusts the power factor correction circuit and the switch circuit according to the second control instruction.

6. The backup power supply system according to claim 4, wherein the power supply circuit further includes an auxiliary power supply circuit, and the auxiliary power circuit is connected to the full-wave rectifier circuit, the control circuit and the battery; wherein, when the utility power is normal, the full-wave rectifier circuit supplies the power to the auxiliary power supply circuit; wherein, when the utility power is abnormal, the battery supplies the power to the auxiliary power supply circuit.

7. A control method of a backup power supply system, wherein the backup power supply system includes a power supply circuit and an uninterruptible power supply, and the uninterruptible power supply stores backup power, the control method comprising:
    determining, by the power supply circuit, whether or not utility power is normal;
    providing, by the power supply circuit, power to the uninterruptible power supply according to the utility power when the utility power is normal;
    outputting, by the uninterrupted power circuit, a first alternating current voltage to an alternating current load when the utility power is normal, wherein the first alternating current voltage meets a utility power specification;
    providing, by the uninterrupted power circuit, a first part of the backup power to the power supply circuit when the utility power is abnormal;
    outputting, by the uninterrupted power circuit, a second alternating current voltage to the alternating current load according to a second part of the backup power when the utility power is abnormal, wherein the second alternating current voltage meets the utility power specification;
    wherein the power supply circuit includes an output monitoring circuit, and the uninterruptible power supply includes a battery, a battery management circuit, and an inverter;
    wherein the battery stores the backup power, and the battery is connected to the battery management circuit, the inverter, and the output monitoring circuit;
    wherein the battery management circuit is further connected to the output monitoring circuit, and the inverter is provided with the alternating current output terminal;
    wherein the output monitoring circuit includes a plurality of direct current load connection ports, and the direct current load connection ports are configured to connect the plurality of direct current loads;
    wherein, when the utility power is abnormal, the battery outputs the first part of the backup power to the output monitoring circuit and outputs the second part of the backup power to the inverter, the output monitoring circuit converts the first part of the backup power into a plurality of direct current voltages with different volts and the direct current load connection ports outputs the plurality of direct current voltages with different volts to a plurality of direct current loads.

8. The control method of the backup power supply system according to claim 7, further comprising: determining, by the battery management circuit of the uninterruptible power supply, whether or not the backup power stored in the battery of the uninterruptible power supply is sufficient when the utility power is normal, wherein the battery management circuit does not supply the power to the battery when the backup power stored in the battery is sufficient.

9. The control method of the backup power supply system according to claim 8, further comprising: performing a full-wave rectification, a power factor adjustment, a voltage transformation processing, and a filtering processing on the utility power before the power supply circuit outputs the plurality of direct current voltages to the plurality of direct current loads.

* * * * *